United States Patent
Kuba et al.

[11] Patent Number: 5,909,325
[45] Date of Patent: *Jun. 1, 1999

[54] IMAGE DISPLAY APPARATUS

[75] Inventors: Keiichi Kuba; Koichi Takahashi, both of Hachioji, Japan

[73] Assignee: Olympus Optical Co., Ltd., Tokyo, Japan

[*] Notice: This patent is subject to a terminal disclaimer.

[21] Appl. No.: 08/670,702

[22] Filed: Jun. 26, 1996

[30] Foreign Application Priority Data

Jun. 26, 1995 [JP] Japan .................................. 7-158897

[51] Int. Cl.⁶ ...................................................... G02B 5/04
[52] U.S. Cl. ............................ 359/834; 359/633; 359/727
[58] Field of Search .................................... 359/834, 837, 359/857, 858, 859, 631, 726, 727, 728, 729, 730, 731, 402, 633

[56] References Cited

U.S. PATENT DOCUMENTS

| | | | |
|---|---|---|---|
| 3,923,370 | 12/1975 | Mostrom | 359/630 |
| 4,026,641 | 5/1977 | Bosserman et al. | 359/869 |
| 4,173,394 | 11/1979 | Clave et al. | 359/834 |
| 5,134,521 | 7/1992 | Lacroix et al. | 359/631 |
| 5,341,242 | 8/1994 | Gilboa et al. | 359/633 |
| 5,453,877 | 9/1995 | Gerbe et al. | 359/631 |
| 5,459,612 | 10/1995 | Ingleton | 359/633 |
| 5,515,207 | 5/1996 | Foo | 359/731 |
| 5,537,253 | 7/1996 | Cox et al. | 359/630 |
| 5,543,968 | 8/1996 | Freeman et al. | 359/630 |
| 5,594,588 | 1/1997 | Togino | 359/631 |

FOREIGN PATENT DOCUMENTS 2-297516  12/1990  Japan .

*Primary Examiner*—Scott J. Sugarman
*Assistant Examiner*—Dawn-Marie Bey
*Attorney, Agent, or Firm*—Cushman Darby & Cushman IP Group of Pillsbury Madison & Sutro LLP

[57] ABSTRACT

An ocular optical system suitable for a head- or face-mounted image display apparatus which is compact, lightweight and satisfactorily corrected for aberrations, and in which no intermediate image is formed. The image display apparatus includes an image display unit (9) and an optical system (10) for projecting a displayed image into an eyeball (7). The optical system (10) is arranged such that light rays which are emitted from the image display unit (9) and enter the eyeball (7) are reflected at least three times by surfaces (12, 13 and 14) having power in backward ray tracing.

14 Claims, 9 Drawing Sheets

IMAGE DISPLAY APPARATUS

BACKGROUND OF THE INVENTION

The present invention relates to an image display apparatus and, more particularly, to a head- or face-mounted image display apparatus which is retained on a user's head or face to project an image into an observer's eyeball.

In recent years, helmet- and goggle-type head- or face-mounted image display apparatuses have been developed for virtual reality or for the purpose of enabling the user to enjoy a wide-screen image personally.

For example, Japanese Patent Application Laid-Open (KOKAI) No. 2-297516 discloses an image display apparatus including, as shown in FIG. 16, a two-dimensional display device 1 for displaying an image, an objective collimator lens 2, and a parallel transparent plate 3 having off-axis parabolic mirrors at both ends thereof. Image display light from the two-dimensional display device 1 is formed into parallel rays through the objective collimator lens 2. Thereafter, the light rays successively undergo a first transmission by one of the parallel surfaces of the parallel transparent plate 3, a reflection by the first parabolic mirror, some total reflections in the parallel transparent plate 3, a reflection by the second parabolic mirror and a second transmission by the other of the parallel surfaces (a total of 8 reflections and a total of 2 transmissions), thereby forming an intermediate image at the point F and projecting the intermediate image into an observer's eyeball 4.

U.S. Pat. No. 4,026,641 discloses an image display apparatus in which, as shown in FIG. 17, an image displayed by an image display device 1 is converted into a curved object image by a transfer optical element 5, and the object image is projected into an observer's eyeball 4 by a toric reflecting surface 6.

In an image display apparatus of the type in which an image of an image display device is relayed, as shown in FIG. 16, a relay optical system is needed in addition to an ocular optical system. Consequently, the entire optical system increases in both size and weight, and an amount by which the optical system projects from the observer's face or head also increases. Therefore, this type of image display apparatus is not suitable for use as a head- or face-mounted image display apparatus.

In the optical system that focuses parallel rays to form an intermediate image, and also in the optical system that projects an intermediate image into an observer's eyeball, only the parabolic mirror has power. Therefore, exceedingly large aberrations are produced in these optical systems.

When a concave mirror alone is used as an ocular optical system as shown in FIG. 17, even if the concave mirror is a toric surface as in the case of FIG. 17, the ocular optical system produces exceedingly large aberrations, causing the image quality to be degraded.

Accordingly, it is necessary to use a transfer optical element 5 such as a fiber plate for correcting field curvature produced by the ocular optical system. However, comatic and other aberrations cannot satisfactorily be corrected even if the transfer optical element 5 and the toric reflecting surface 6 are used.

SUMMARY OF THE INVENTION

In view of the above-described problems of the conventional techniques, an object of the present invention is to provide an ocular optical system suitable for a head- or face-mounted image display apparatus which is compact, lightweight and satisfactorily corrected for aberrations, and in which no intermediate image is formed.

To attain the above-described object, the present invention provides an image display apparatus which includes an image display unit and an optical system for projecting an image displayed by the image display unit into an eyeball. The optical system is arranged such that light rays which are emitted from the image display unit and enter the eyeball are reflected at least three times by surfaces having power in backward ray tracing.

In this case, the optical system may be arranged such that the light rays are reflected three times in total by surfaces having reflecting action and transmitted by refracting surfaces twice in total, and that the first and third reflections in the backward ray tracing are performed by an identical surface. Alternatively, the optical system may be arranged such that the light rays are reflected three times in total by surfaces having reflecting action and transmitted twice in total by refracting surfaces, and that the second reflection and the second transmission in the -backward ray tracing are performed by an identical surface. The optical system may also be arranged such that the light rays are reflected at least four times in total by surfaces having reflecting action and transmitted twice in total by refracting surfaces. It is desirable for the surfaces having reflecting action to be surfaces having power.

The reason for adopting the above-described arrangements and the functions thereof will be explained below. The following explanation will be given on the basis of backward ray tracing in which light rays are traced from the observer's pupil position toward the image display device, for the convenience of designing the optical system.

In the present invention, the optical system for projecting a displayed image into an eyeball is arranged such that light rays which are emitted from the image display unit and enter the eyeball are reflected at least three times by surfaces having power in the backward ray tracing.

In comparison of reflecting and refracting surfaces of the same power, reflecting surfaces, e.g. concave mirrors, convex mirrors, etc., produce a smaller amount of aberration than refracting surfaces. Reflecting surfaces produce no chromatic aberration. If there are three or more reflecting surfaces having power, as in the present invention, it is possible to disperse power required for an ocular optical system, and the power of each individual reflecting surface can be minimized. Consequently, it is possible to reduce field curvature, spherical and other aberrations produced by reflecting surfaces, e.g. concave mirrors, convex mirrors, etc. In addition, the size of the optical system can be reduced by reflecting the light rays three or more times and thereby folding the optical path in a compact form.

The arrangement of the optical system is simplified by arranging it such that the light rays are reflected three times in total by surfaces having power and transmitted by refracting surfaces twice in total, and that a single surface is assigned to perform both the first and third reflecting actions in the backward ray tracing.

When it comprises a single optical element, the optical system has "a transmitting action when the light rays enter the optical element", "three reflecting actions in the optical element", and "a transmitting action when the light rays exit from the optical element".

If the first and third reflecting actions of the three reflecting actions are assigned to a single surface, as described above, the arrangement of the optical element is simplified.

If the optical system comprises a single optical element, the optical path is formed in a medium having a refractive index larger than 1. Therefore, the size of the optical system can be reduced.

For example, a reflecting action performed by a concave surface produces a negative field curvature. A decentered concave mirror produces strong positive comatic aberration, whereas a decentered convex mirror produces strong negative comatic aberration. Therefore, the ocular optical system is arranged such that the three reflecting actions are positive, negative and positive in power in the sequence of the backward ray tracing. By doing so, field curvature can be corrected. If the reflecting surfaces are decentered, comatic aberration can be corrected.

It is desirable that the angle e between the incident angle and the reflection angle with respect to the first reflecting surface should satisfy the following condition:

$$30° < \theta < 90° \tag{1}$$

If the angle $\theta$ is not smaller than 90°, the optical system lengthens vertically. If the angle $\theta$ is not larger than 30°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. These aberrations can be corrected by using an anamorphic surface as at least one of the surfaces having power.

When an anamorphic surface is used, it is desirable to satisfy the following condition:

$$R_x/R_y < 1 \tag{2}$$

where $R_x$, is a radius of curvature in the XZ-plane, and $R_y$ is a radius of curvature in the YZ-plane.

If the ratio $R_x/R_y$ is not smaller than 1, the distance between the optical element constituting the optical system and the image display device [e.g. a liquid crystal display device (LCD)] increases, and it becomes likely that light rays leaving the optical element will exit not from the final refracting surface but from the second reflecting surface. Therefore, it becomes impossible to construct the desired optical system.

Field curvature can also be corrected by arranging the ocular optical system such that the three reflecting actions are negative, positive and negative in power in the sequence of the backward ray tracing. If the reflecting surfaces are decentered, comatic aberration can be corrected.

In this case also, it is desirable that the angle $\theta$ between the incident angle and the reflection angle with respect to the first reflecting surface should satisfy the following condition:

$$30° < \theta < 90° \tag{1}$$

If the angle $\theta$ is not smaller than 90°, the optical system lengthens vertically. If the angle $\theta$ is not larger than 30°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. In this case also, the aberrations can be corrected by using an anamorphic surface as at least one of the surfaces having power.

When an LCD is used as an image display device, it is necessary to arrange the optical system to be telecentric on the image side (i.e. the LCD side) because the LCD has a small viewing angle. Accordingly, the telecentricity can be improved by using a negative refracting surface as a refracting surface immediately in front of the LCD. In a case where the three reflecting actions are positive, negative and positive in power in the sequence of the backward ray tracing, field curvature can be corrected even more effectively by assigning a negative action to the refracting surface immediately in front of the LCD.

In the present invention, the arrangement of the optical system can also be simplified by arranging it such that the light rays are reflected three times in total by surfaces having power and transmitted by refracting surfaces twice in total, and that a single surface is assigned to perform both the second reflecting action and the second transmitting action in the backward ray tracing.

If the optical system comprises a single optical element and the second reflecting action and the second transmitting action are assigned to a single surface, as described above, the arrangement of the optical system is simplified. In this case, the reflecting action must be total reflection because a reflective coating cannot be provided on the surface serving as both reflecting and transmitting surfaces. Conversely, if the reflecting action is total reflection, no reflective coating is needed.

In this case, a reflecting action performed by a concave surface, for example, produces negative field curvature. A decentered concave mirror produces strong positive comatic aberration, whereas a decentered convex mirror produces strong negative comatic aberration. Therefore, the ocular optical system is arranged such that the three reflecting actions are positive, negative and positive in power in the sequence of the backward ray tracing. By doing so, field curvature can be corrected. If the reflecting surfaces are decentered, comatic aberration can be corrected.

It is desirable that the angle $\theta$ between the incident angle and the reflection angle with respect to the first reflecting surface should satisfy the following condition:

$$30° < \theta < 90° \tag{1}$$

If the angle $\theta$ is not smaller than 90°, the optical system lengthens vertically. If the angle $\theta$ is not larger than 30°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. These aberrations can be corrected by using an anamorphic surface as at least one of the surfaces having power.

When an anamorphic surface is used, it is desirable to satisfy the following condition:

$$0.5 < R_x/R_y < 1.5 \tag{3}$$

If the ratio $R_x/R_y$ is not smaller than the upper limit, i.e. 1.5, the distance between the optical element and the LCD becomes excessively long, although aberration correction can be made even more effectively. In addition, it becomes likely that light rays leaving the optical element will exit not from the final refracting surface but from the second reflecting surface. Therefore, the optical system cannot favorably be arranged. Conversely, if the ratio is not larger than the lower limit, i.e. 0.5, the distance between the optical element and the LCD reduces, and light rays leaving the optical element exit not from the second reflecting surface but from the final refracting surface. Therefore, the optical system can be favorably arranged. However, aberrations are aggravated.

In the present invention, power required for the ocular optical system can be dispersed even more effectively and the power of each individual surface can be minimized by arranging the ocular optical system such that light rays are reflected at least four times in total by surfaces having power and transmitted by refracting surfaces twice in total. Consequently, it is possible to reduce field curvature, spherical and other aberrations produced by reflecting surfaces, e.g. concave mirrors, convex mirrors, etc. In addition, the size of the optical system can be further reduced by reflecting light rays four or more times and thereby folding the optical path in a compact form.

The arrangement of the optical system is simplified by arranging it such that at least two of the four or more reflecting actions are performed by an identical surface.

If the third and fifth surfaces in the backward ray tracing are the same surface, the second and fourth reflections, which are reflecting actions taking place on the observer side of the optical system, can be assigned to a single surface. Accordingly, the structure of the observer-side part of the optical element can be simplified, and it is possible to relieve the interference between the optical system of the head-mounted image display apparatus and the observer.

If the second and fourth surfaces in the backward ray tracing are the same surface, the first and third reflections, which are reflecting actions taking place on the outside world side of the optical element, can be assigned to a single surface. Accordingly, the structure of the outside world-side part of the optical element can be simplified, and it is possible to minimize the amount of projection of the ocular optical system of the head-mounted image display apparatus.

The arrangement may be such that the first and third reflections and the second transmission are assigned to a single surface, and that the third reflection is total reflection. In the case of four reflections in total, two of the four reflections and one of two transmissions can be assigned to a single surface. Therefore, the arrangement of the optical system becomes extremely simple. To assign transmitting action to the sixth surface in the backward ray tracing, if the second, fourth and sixth surfaces are the same surface, the reflection at the fourth surface (i.e. the third reflection) must be total reflection because a reflective coating cannot be provided on the sixth surface.

In this case also, it is desirable that the angle θ between the incident angle and the reflection angle with respect to the first reflecting surface should satisfy the following condition:

$$30° < \theta < 90° \quad (1)$$

If the angle θ is not smaller than 90°, the optical system lengthens vertically. If the angle θ is not larger than 30°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. These aberrations can be corrected by using an anamorphic surface as at least one of the surfaces having power.

When an anamorphic surface is used, it is desirable to satisfy the following condition:

$$R_x/R_y < 1 \quad (2)$$

where $R_x$ is a radius of curvature in the XZ-plane, and $R_y$ is a radius of curvature in the YZ-plane.

If the ratio $R_x/R_y$ is not smaller than 1, the distance between the optical element constituting the optical system and the image display device [e.g. a liquid crystal display device (LCD)] increases, and it becomes likely that light rays leaving the optical element will exit not from the final refracting surface but from the second reflecting surface. Therefore, it becomes impossible to construct the desired optical system.

If there are two or more surfaces each performing two or more reflections, the arrangement of the optical system is simplified even more effectively.

In a case where the first and third reflections and the second transmission are assigned to a single surface, two of the four reflections and one of the two transmissions can be assigned to a single surface. Therefore, the arrangement of the optical system becomes extremely simple.

In this case, a reflecting action performed by a concave surface, for example, produces negative field curvature. A decentered concave mirror produces strong positive comatic aberration, whereas a decentered convex mirror produces strong negative comatic aberration. Therefore, the ocular optical system is arranged such that the four reflecting actions are negative, positive, negative and positive in power in the sequence of the backward ray tracing. By doing so, field curvature can be corrected. If the reflecting surfaces are decentered, comatic aberration can be corrected.

It is desirable that the angle θ between the incident angle and the reflection angle with respect to the first reflecting surface should satisfy the following condition:

$$40° < \theta < 120° \quad (4)$$

If the angle θ is not smaller than 120°, the optical system lengthens vertically. If the angle θ is not larger than 40°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. These aberrations can be corrected by using an anamorphic surface as at least one of the surfaces having power.

When an anamorphic surface is used, it is desirable to satisfy the Following condition:

$$R_x/R_y < 1 \quad (2)$$

where $R_x$ is a radius of curvature in the XZ-plane, and $R_y$ is a radius of curvature in the YZ-plane.

If the ratio $R_x/R_y$ is not smaller than 1, the distance between the optical element constituting the optical system and the image display device [e.g. a liquid crystal display device (LCD)] increases, and it becomes likely that light rays leaving the optical element will exit not from the final refracting surface but from the second reflecting surface. Therefore, it becomes impossible to construct the desired optical system.

In a case where there are two or more surfaces each performing two or more reflections, or in a case where the second and fourth reflections in the backward ray tracing are performed by an identical surface, if the reflecting actions are positive, negative, positive and negative in power in the sequence of the backward ray tracing, field curvature can be corrected. If the reflecting surfaces are decentered, comatic aberration can be corrected.

In a case where the second and fourth reflections in the backward ray tracing are performed by an identical surface, if the third reflection and the second transmission are performed by an identical surface, the arrangement of the optical system is simplified.

In a case where there are two or more surfaces each performing two or more reflections, or in a case where the second and fourth reflections in the backward ray tracing are performed by an identical surface, if the reflecting actions are positive, negative, positive and negative in power in the sequence of the backward ray tracing, or if the second and fourth reflections in the backward ray tracing are performed by an identical surface and the third reflection and the second transmission are performed by an identical surface, it is desirable that the angle θ between the incident angle and the reflection angle with respect to the first reflecting surface should satisfy the following condition:

$$20°<\theta<80° \quad (5)$$

If the angle θ is not smaller than 80°, the optical system lengthens vertically. If the angle θ is not larger than 20°, the first surface and third surface (second reflecting surface) of the optical system interfere with each other.

Assuming that a vertical plane containing an observer's visual axis is defined as a YZ-plane, and a horizontal plane containing the observer's visual axis is defined as an XZ-plane, if the first reflecting surface is decentered with respect to the visual axis, the incident angle of light rays to the XZ-plane and the incident angle thereof to the YZ-plane differ from each other, causing asymmetric aberrations, particularly astigmatism, to occur. These aberrations can be corrected by using an anamorphic surface as at least one of the surfaces having power.

When an anamorphic surface is used, it is desirable to satisfy the following condition:

$$0.5<R_x/R_y<1.5 \quad (3)$$

If the ratio $R_x/R_y$ is not smaller than the upper limit, i.e. 1.5, the distance between the optical element and the LCD becomes excessively long, although aberration correction can be made even more effectively. In addition, it becomes likely that light rays leaving the optical element will exit not from the final refracting surface but from the second reflecting surface. Therefore, the optical system cannot favorably be arranged. Conversely, if the ratio is not larger than the lower limit, i.e. 0.5, the distance between the optical element and the LCD reduces, and light rays leaving the optical element exit not from the second reflecting surface but from the final refracting surface. Therefore, the optical system can be favorably arranged. However, aberrations are aggravated.

In a case where the second and fourth reflections in the backward ray tracing are performed by an identical surface, and the reflecting actions are positive, negative, positive and negative in power in the sequence of the backward ray tracing, and in a case where the third reflection and the second transmission are performed by an identical surface, if the second reflection is total reflection, the arrangement of the optical system is simplified, and it becomes unnecessary to provide a reflective coating. In this case, if the second and third reflections are each total reflection, the advantageous effects become even more remarkable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 12 of the optical system of a head-mounted image display apparatus according to the present invention will be described below with reference to FIGS. 1 to 12, which are sectional views of optical systems designed for a single eye according to Examples 1 to 12.

Figure 1:
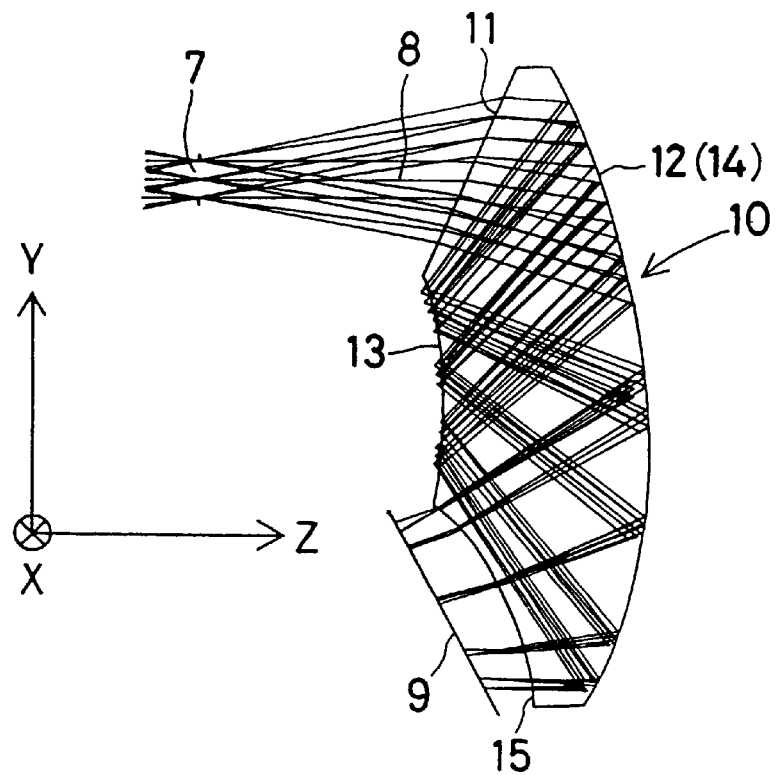
FIG. 1 is a sectional view of an optical system in Example 1 of the image display apparatus according to the present invention.

Constituent parameters of each example will be shown later. In the following description, the surface numbers (hereinafter referred to as Nos.) are shown as ordinal numbers in backward tracing from an observer's pupil position 7 toward an image display device (LCD) 9. A coordinate system is defined as follows: As shown in FIG. 1, with the observer's iris position 7 defined as the origin, the direction of an observer's visual axis 8 is taken as a Z-axis, where the direction toward an ocular optical system 10 from the origin is defined as a positive direction, and the vertical direction (as viewed from the observer's eyeball) which perpendicularly intersects the observer's visual axis 8 is taken as a Y-axis, where the upward direction is defined as a position direction. Further, the horizontal direction (as viewed from the observer's eyeball) which perpendicularly intersects the observer's visual axis 8 is taken as an X-axis, where the leftward direction is defined as a positive direction. That is, the plane of the figure is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface (including the image display device 9) in Examples 1 to 9 for which eccentricities Y and Z and inclination angle θ are shown, the eccentricity Y is a distance by which the vertex of the surface decenters in the Y-axis direction from the surface No. 1 (pupil position 7), which is a reference surface, and the eccentricity Z is a distance by which the vertex of the surface decenters in the Z-axis direction from the surface No. 1. The inclination angle θ is the angle of inclination of the central axis of the surface from the Z-axis. In this case, positive θ means counterclockwise rotation. Regarding surface separations, the surface separation of the surface No. 2 is the distance from the surface No. 1 along the Z-axis direction. In Examples 10 to 12, each surface is regarded as an optical system coaxial with respect to the visual axis 8, and parameters are shown according to the conventional method. For only surfaces whose central axes are inclined with respect to the visual axis 8, the angle of inclination of the central axis of each surface from the visual axis 8 is shown as θ. Y is a distance in the Y-axis direction from the center of the surface No. 1 (i.e. the pupil position 7), and Z is a distance in the Z-axis direction from the center of the surface No. 1. θ is an inclination angle of a line normal to the surface relative to the visual axis 8. Regarding the surface separation, the direction of the backward ray tracing along the optical axis is defined as a positive direction.

The non-rotationally symmetric aspherical configuration of each surface may be expressed in the coordinate system defining the surface as follows:

$$Z = [(X^2/R_x) + (Y^2/R_y)]/[1 + \{1-(1+K_x)(X^2/R_x^2) -$$

$$(1+K_y)(Y^2/R_y^2)\}^{1/2}] +$$

$$AR\,[(1-AP)X^2 + (1+AP)Y^2]^2 +$$

$$BR\,[(1-BP)X^2 + (1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=[(h^2/R)/[1+\{1-(1+K)(h^2/R^2)\}^{1/2}]+Ah^4+Bh^6+Ch^8$$

where R is the paraxial curvature radius; K is the conical coefficient; A, B and C are 4th-, 6th- and 8th-order aspherical coefficients, respectively; and h is given by $h^2=X^2+y^2$.

It should be noted that the refractive index of the medium between a pair of adjacent surfaces is expressed by the refractive index for the spectral d-line. Lengths are given in millimeters.

The following examples are all image display apparatuses for a single eye. An image display apparatus for the other eye can be realized by disposing the constituent optical elements of each example in symmetrical relation to the illustrated apparatus with respect to the YZ-plane.

In an actual apparatus, needless to say, the direction in which the optical axis is bent by the ocular optical system may be any of the upward, downward and sideward directions of the observer.

In each sectional view, reference numeral 7 denotes an observer's pupil position, 8 an observer's visual axis, 9 an image display device, 10 an ocular optical system, 11 a first surface of the ocular optical system, 12 a second surface of the ocular optical system, 13 a third surface of the ocular optical system, 14 a fourth surface of the ocular optical system, 15 a fifth surface of the ocular optical system, and 16 a sixth surface of the ocular optical system.

EXAMPLE 1

In this example, as shown in the sectional view of FIG. 1, the horizontal field angle is 30°, while the vertical field angle is 23°, and the pupil diameter is 4 millimeters. The first surface 11 performs a positive refracting action. The second surface 12, the third surface 13 and the fourth surface 14 perform positive, negative and positive reflecting actions, respectively. The fifth surface 15 performs a negative refracting action. A single surface serves as both the second surface 12 and the fourth surface 14. The first surface 11 is a spherical surface. The second surface 12 is an anamorphic surface. The third surface 13 is an anamorphic surface. The fifth surface 15 is a spherical surface. Because the first surface 11 and the second surface 12 are decentered, the incident angle of light rays to the XZ-plane and the incident angle thereof to the YZ-plane differ from each other, causing astigmatism and other aberrations to occur. The aberrations are corrected by using an anamorphic surface as the second surface 12. Negative power is given to the refracting surface 15, which is immediately in front of the image display device 9, thereby improving telecentricity and favorably correcting field curvature.

Figure 13:
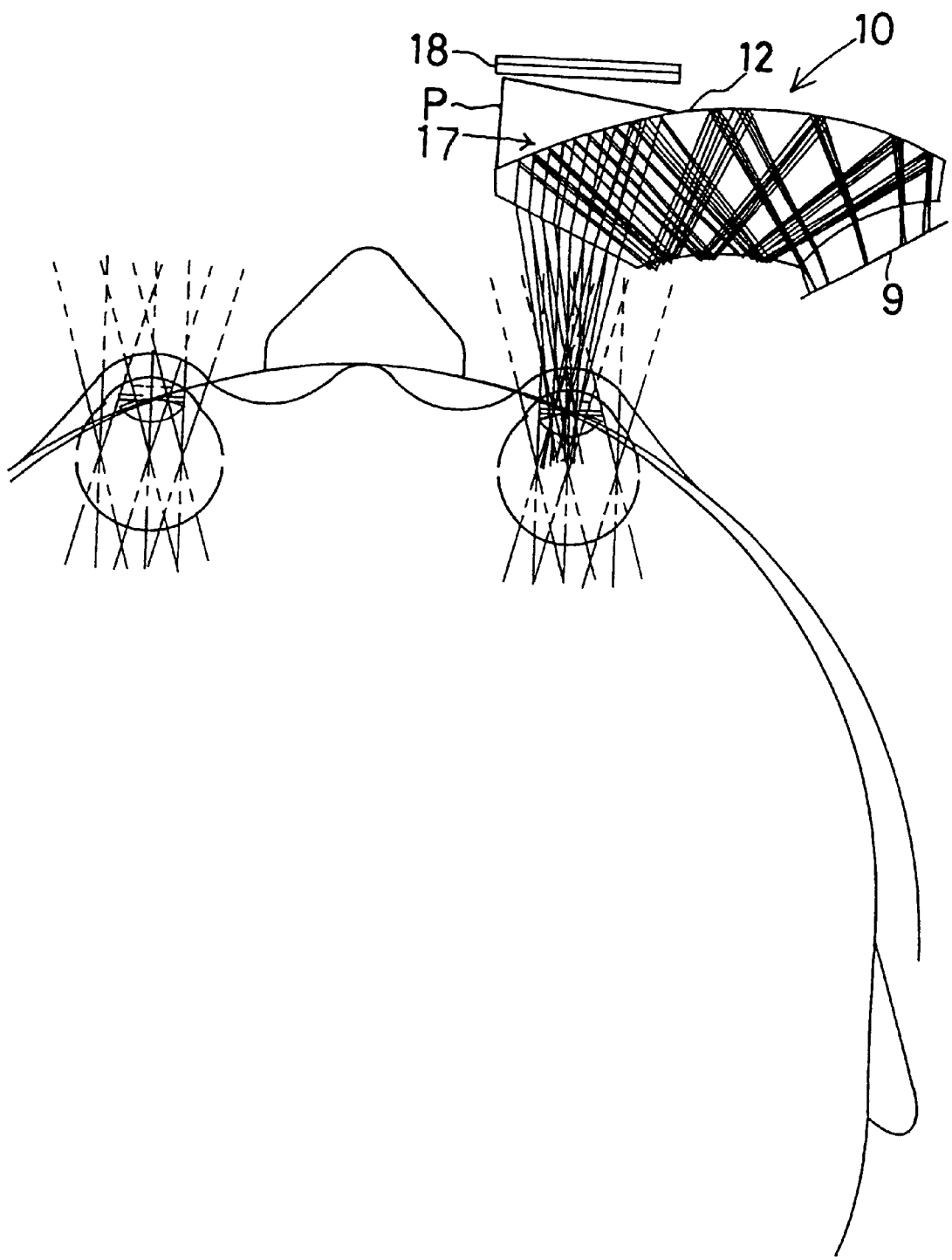
FIG. 13 shows one example of the disposition of the optical system in Example 1.

In this example, light rays undergo reflection an odd number (three) of times. In the case of reflection taking place an odd number of times, the image display device 9 lies close to the observer's face and is likely to interfere with it. Therefore, as shown in FIG. 13, the optical system 10 may be disposed horizontally at a side of the observer's face. This makes it easy to prevent the interference between the image display device 9 and the observer's face. It should be noted that an outside world image can be observed selectively or superimposed on the image of the image display device 9 by using a half-mirror to form a first reflection region 17 of the second surface 12 and disposing a combination of a liquid crystal shutter 18 and a see-through correcting prism P in front of the half-mirror 17.

Figure 14:
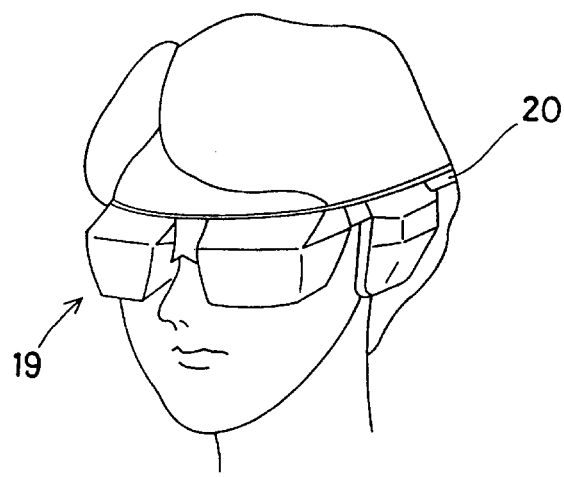
FIG. 14 is a perspective view of the optical system in Example 1 as arranged in the form of a head-mounted image display apparatus.

To arrange the ocular optical system 10 with the liquid crystal shutter 18 as a head-mounted image display apparatus 19, as shown in FIG. 14, the apparatus 19 is fitted to the observer's head by using a headband 20, for example. The same shall apply in the following examples.

With a view to providing a lightweight face-mounted image display apparatus, it is preferable to use a plastic material as a medium of the optical element 10.

EXAMPLE 2

Figure 2:
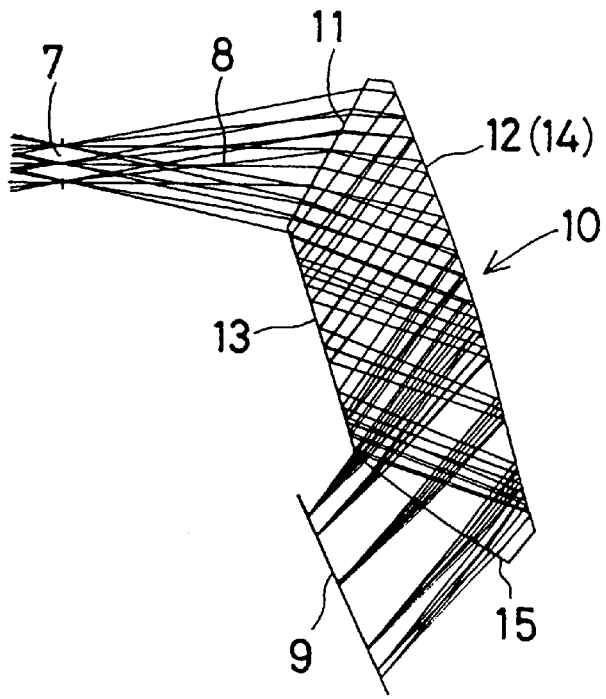
FIG. 2 is a sectional view of an optical system in Example 2 of the image display apparatus according to the present invention.

In this example, as shown in the sectional view of FIG. 2, the horizontal field angle is 30°, while the vertical field angle is 23°, and the pupil diameter is 4 millimeters. The first surface 11 performs a negative refracting action. The second surface 12, the third surface 13 and the fourth surface 14 perform positive, zero (plane surface) and positive reflecting actions, respectively. The fifth surface 15 performs a positive refracting action. A single surface serves as both the second surface 12 and the fourth surface 14. The first surface 11 is a spherical surface. The second surface 12 is an anamorphic surface. The third surface 13 is a plane surface. The fifth surface 15 is a spherical surface.

Figure 15:
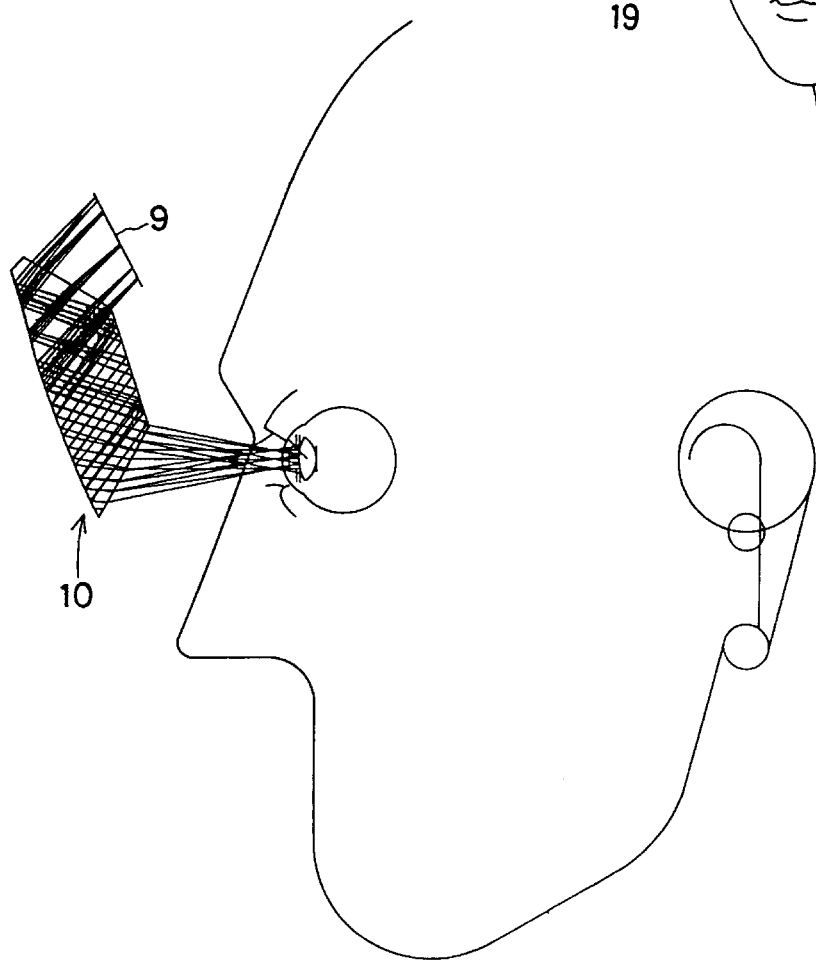
FIG. 15 shows one example of the disposition of the optical system in Example 2.
Figure 16:
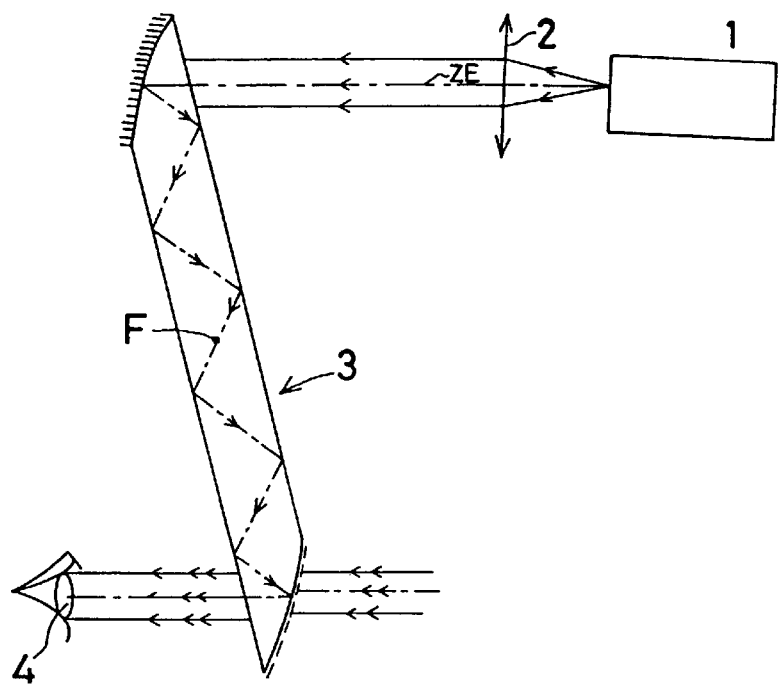
FIG. 16 Shows the arrangement of a conventional head-mounted image display apparatus.
Figure 17:
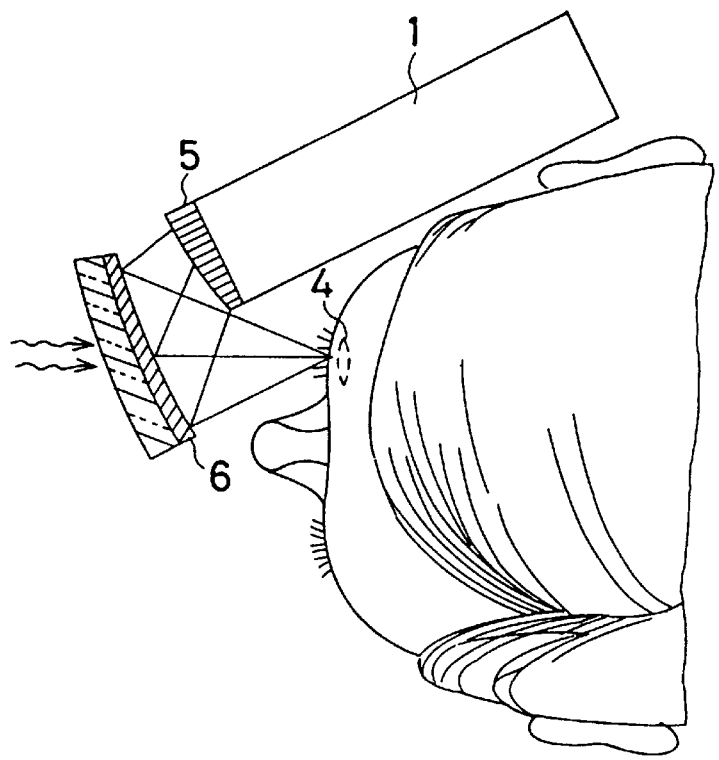
FIG. 17 shows the arrangement of another conventional head-mounted image display apparatus.

It should be noted that, if the optical system 10 is disposed in front of the observer's forehead as shown in FIG. 15, it becomes easy to utilize outside world light as illuminating light for the image display device (LCD) 9.

EXAMPLE 3

Figure 3:
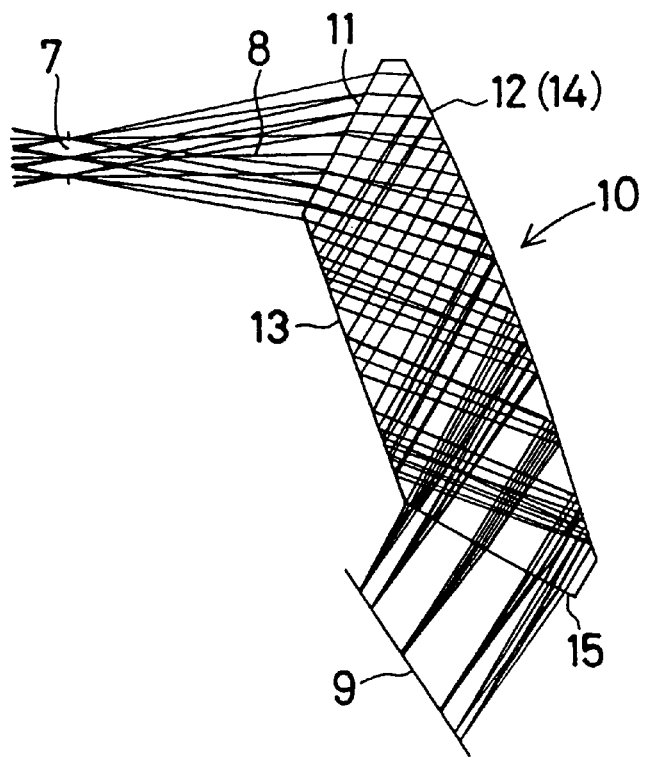
FIG. 3 is a sectional view of an optical system in Example 3 of the image display apparatus according to the present invention.

In this example, as shown in the sectional view of FIG. 3, the horizontal field angle is 30°, while the vertical field angle is 23°, and the pupil diameter is 4 millimeters. The first surface 11 performs a negative refracting action. The second surface 12, the third surface 13 and the fourth surface 14 perform positive, positive and positive reflecting actions, respectively. The fifth surface 15 performs a positive refracting action. A single surface serves as both the second surface 12 and the fourth surface 14. The first surface 11 is a spherical surface. The second surface 12 is an anamorphic surface. The third surface 13 is a spherical surface. The fifth surface 15 is a spherical surface.

In this example, an anamorphic surface is used as the surface 12, which has principal power, thereby effectively correcting asymmetric aberrations, e.g. astigmatism.

EXAMPLE 4

Figure 4:
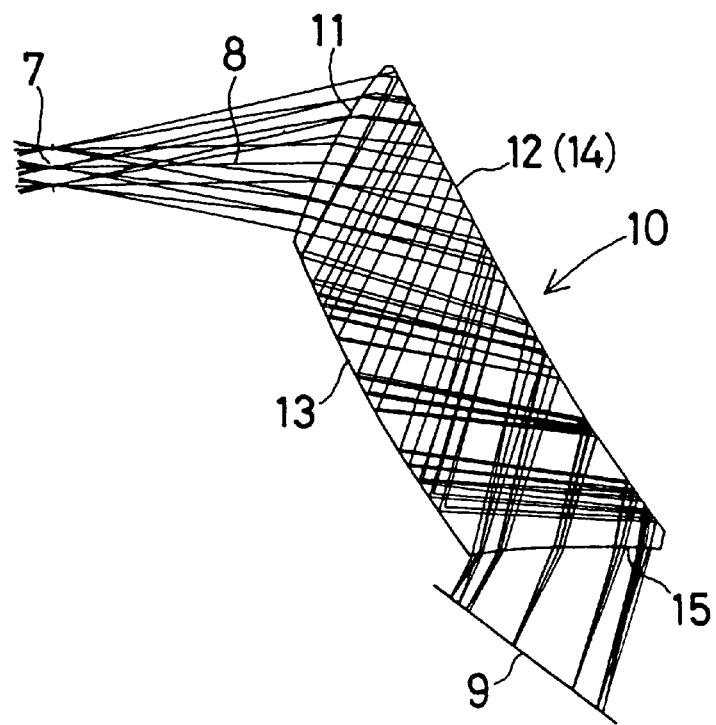
FIG. 4 is a sectional view of an optical system in Example 4 of the image display apparatus according to the present invention.

In this example, as shown in the sectional view of FIG. 4, the horizontal field angle is 30°, while the vertical field angle is 23°, and the pupil diameter is 4 millimeters. The first surface 11 performs a positive refracting action. The second surface 12, the third surface 13 and the fourth surface 14 perform negative, positive and negative reflecting actions, respectively. The fifth surface 15 performs a negative refracting action. A single surface serves as both the second surface 12 and the fourth surface 14. The first surface 11 is a spherical surface. The second surface 12 is an anamorphic surface. The third surface 13 is a spherical surface. The fifth surface 15 is a spherical surface.

EXAMPLE 5

Figure 5:
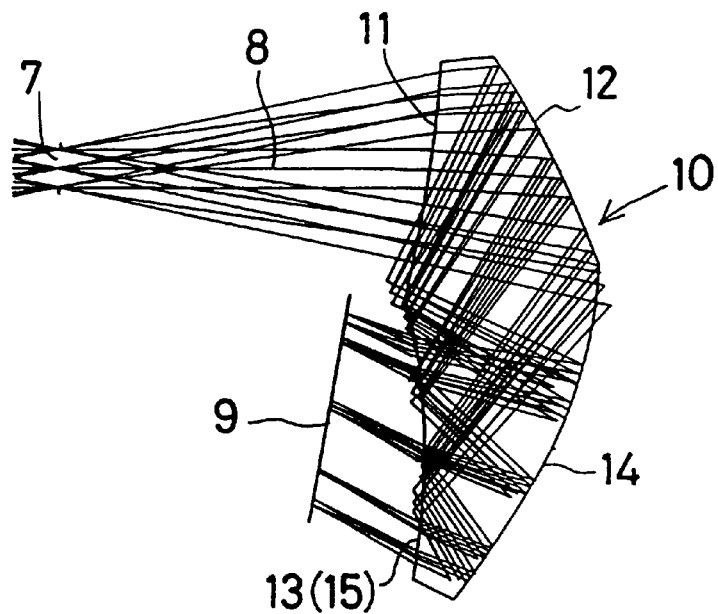
FIG. 5 is a sectional view of an optical system in Example 5 of the image display apparatus according to the present invention.

In this example, as shown in the sectional view of FIG. 5, the horizontal field angle is 30°, while the vertical field angle is 23°, and the pupil diameter is 4 millimeters. The first surface 11 performs a negative refracting action. The second surface 12, the third surface 13 and the fourth surface 14 perform positive, negative and positive reflecting actions, respectively. The fifth surface 15 performs a negative refracting action. A single surface serves as both the third surface 13 and the fifth surface 15. The second reflection at the third surface 13 is total reflection. The first surface 11 to the fifth surface 15 are all spherical surfaces.

As described above, the third surface 13 (the fifth surface 15) is assigned to perform both the second reflecting action and the second transmitting action. Thus, this surface cannot be provided with a reflective coating because it also performs the second transmission. Therefore, the optical system 10 is arranged such that the second reflection takes place as total reflection. To enable total reflection to take place easily, a convex surface is used as the third surface 13 (the fifth surface 15), and concave surfaces are used as the surfaces 12 and 14 which precede and follow, respectively, the third surface 13 (the fifth surface 15), thereby effecting aberration correction.

It should be noted that negative power is given to the refracting surface 15, which is immediately in front of the image display device 9, thereby improving telecentricity and favorably correcting field curvature.

EXAMPLE 6

Figure 6:
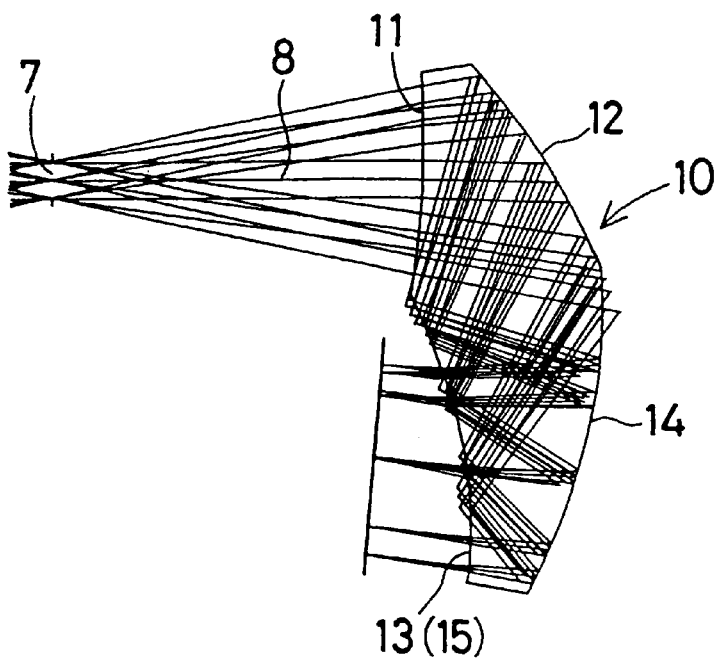
FIG. 6 is a sectional view of an optical system in Example 6 of the image display apparatus according to the present invention.

In this example, as shown in the sectional view of FIG. 6, the horizontal field angle is 30°, while the vertical field angle is 23°, and the pupil diameter is 4 millimeters. The first surface 11 performs a negative refracting action. The second surface 12, the third surface 13 and the fourth surface 14 perform positive, negative and positive reflecting actions, respectively. The fifth surface 15 performs a negative refracting action. A single surface serves as both the third surface 13 and the fifth surface 15. The second reflection at the third surface 13 is total reflection. The first surface 11 is a spherical surface. The second surface 12 is an anamorphic surface. The third surface 13 is a spherical surface. The fourth surface 14 is a spherical surface.

In this example, because the first surface 11 and the second surface 12 are decentered, the incident angle of light rays to the XZ-plane and the incident angle thereof to the YZ-plane differ from each other, causing astigmatism and other aberrations. The aberrations are corrected by using an anamorphic surface as the second surface 12.

EXAMPLE 7

Figure 7:
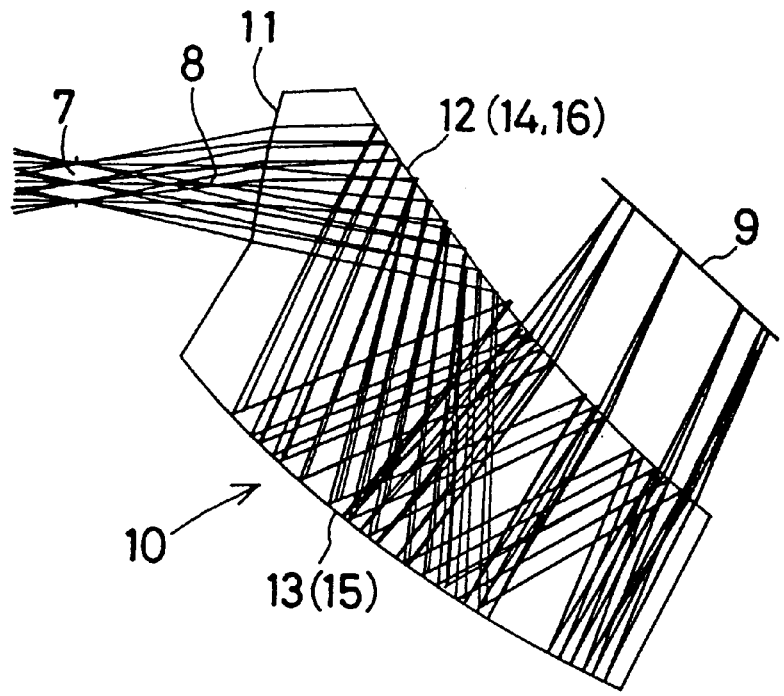
FIG. 7 is a sectional view of an optical system in Example 7 of the image display apparatus according to the present invention.

In this example, as shown in the sectional view of FIG. 7, the horizontal field angle is 30°, while the vertical field angle is 23°, and the pupil diameter is 4 millimeters. The first surface 11 performs a positive refracting action. The second surface 12, the third surface 13, the fourth surface 14 and the fifth surface 15 perform negative, positive, negative and positive reflecting actions, respectively. The sixth surface 16 performs a negative refracting action. A single surface serves as all the second surface 12, the fourth surface 14 and the sixth surface 16. Moreover, a single surface serves as both the third surface 13 and the fifth surface 15. The first surface 11 is a spherical surface. The second surface 12 is an anamorphic surface. The third surface 13 is an anamorphic surface.

EXAMPLE 8

Figure 8:
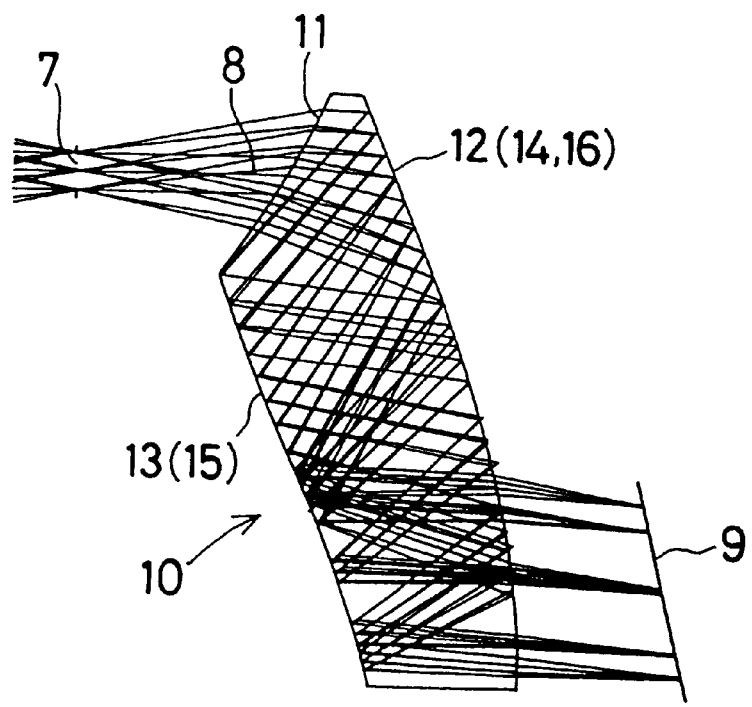
FIG. 8 is a sectional view of an optical system in Example 8 of the image display apparatus according to the present invention.

In this example, as shown in the sectional view of FIG. 8, the horizontal field angle is 30°, while the vertical field angle is 23°, and the pupil diameter is 4 millimeters. The first surface 11 performs a negative refracting action. The second surface 12, the third surface 13, the fourth surface 14 and the fifth surface 15 perform positive, negative, positive and negative reflecting actions, respectively. The sixth surface 16 performs a positive refracting action. A single surface serves as all the second surface 12, the fourth surface 14 and the sixth surface 16. Moreover, a single surface serves as both the third surface 13 and the fifth surface 15. The first surface 11 is a spherical surface. The second surface 12 is an anamorphic surface. The third surface 13 is an anamorphic surface.

EXAMPLE 9

Figure 9:
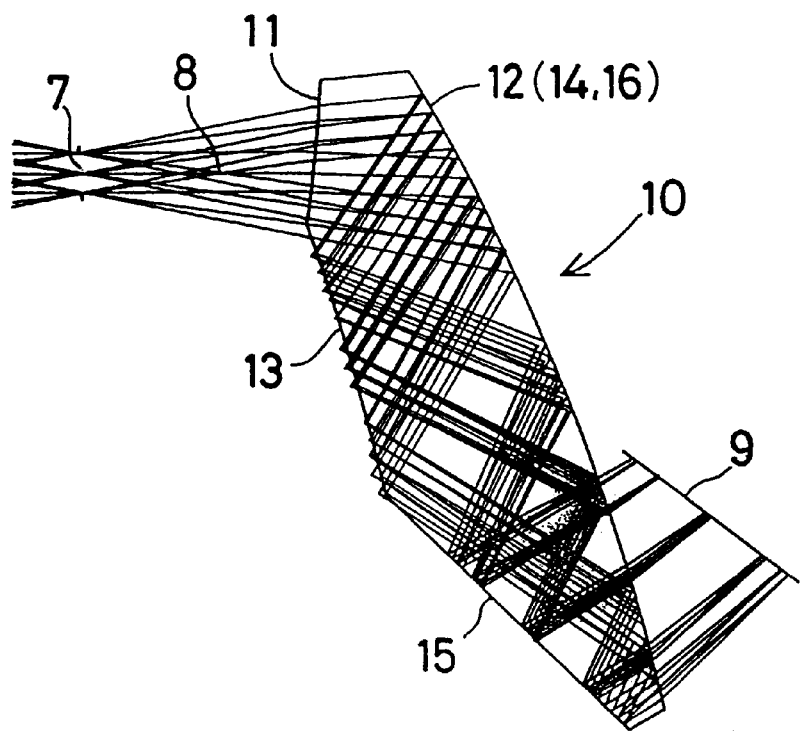
FIG. 9 is a sectional view of an optical system in Example 9 of the image display apparatus according to the present invention.

In this example, as shown in the sectional view of FIG. 9, the horizontal field angle is 30°, while the vertical field angle is 23°, and the pupil diameter is 4 millimeters. The first surface 11 performs a negative refracting action. The second surface 12, the third surface 13, the fourth surface 14 and the fifth surface 15 perform positive, negative, positive and positive reflecting actions, respectively. The sixth surface 16 performs a positive refracting action. A single surface serves as all the second surface 12, the fourth surface 14 and the sixth surface 16. The first surface 11 is a spherical surface. The second surface 12 is an anamorphic surface. The third surface 13 is an anamorphic surface. The fifth surface 15 is a spherical surface.

The arrangement according to this example makes it easy to utilize outside world light as illuminating light for the image display device (e.g. an LCD) 9.

EXAMPLE 10

Figure 10:
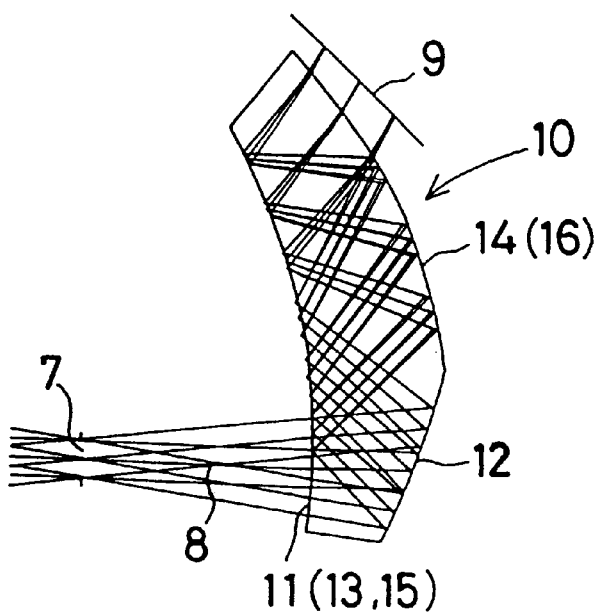
FIG. 10 is a sectional view of an optical system in Example 10 of the image display apparatus according to the present invention.

In this example, as shown in the sectional view of FIG. 10, the horizontal field angle is 20°, while the vertical field angle is 15°, and the pupil diameter is 4 millimeters. The first surface 11 performs a negative refracting action. The second surface 12, the third surface 13, the fourth surface 14 and the fifth surface 15 perform positive, negative, positive and negative reflecting actions, respectively. The sixth surface 16 performs a positive refracting action. A single surface serves as all the first surface 11, the third surface 13 and the fifth surface 15. A single surface serves as both the fourth surface 14 and the sixth surface 16. The first surface 11 is a spherical surface. The second surface 12 is an anamorphic surface. The fourth surface 14 is an aspherical surface.

In this example, if the angle of decentration of the second surface 12 is increased, the optical system 10 lengthens vertically. Therefore, the decentration angle of the second surface 12 is reduced. However, a reduction of the decentration angle of the second surface 12 causes overlap of the position of a bundle of rays passing through the first surface 11 and the position of a ray bundle reflected by the third surface 13. For this reason, the optical system 10 is arranged such that the second reflection (at the third surface 13) is total reflection.

EXAMPLE 11

Figure 11:
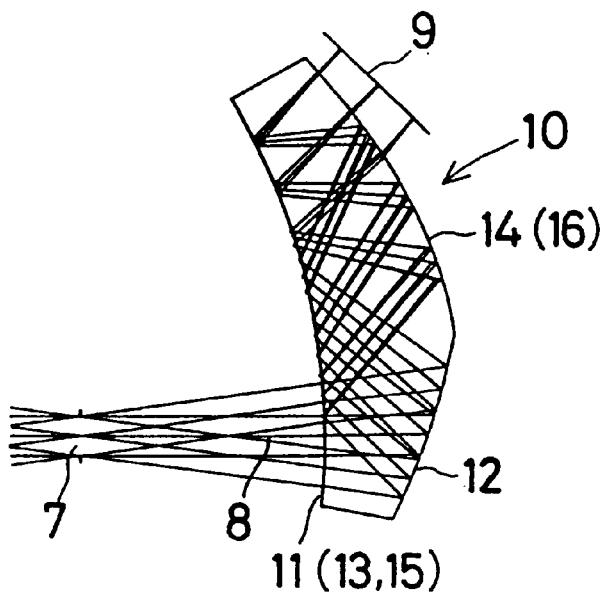
FIG. 11 is a sectional view of an optical system in Example 11 of the image display apparatus according to the present invention.

In this example, as shown in the sectional view of FIG. 11, the horizontal field angle is 20°, while the vertical field angle is 15°, and the pupil diameter is 4 millimeters. The first surface 11 performs a negative refracting action. The second surface 12, the third surface 13, the fourth surface 14 and the fifth surface 15 perform positive, negative, positive and negative reflecting actions, respectively. The sixth surface 16 performs a positive refracting action. A single surface serves as all the first surface 11, the third surface 13 and the fifth surface 15. A single surface serves as both the fourth surface 14 and the sixth surface 16. The first surface 11 is a spherical surface. The second surface 12 is an anamorphic surface. The fourth surface 14 is an anamorphic surface. The second reflection (at the third surface 13) is total reflection as is the case with Example 10.

EXAMPLE 12

Figure 12:
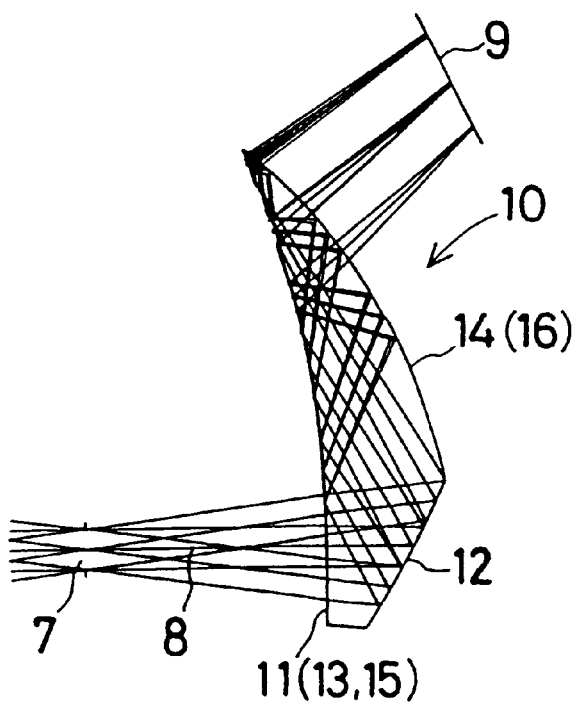
FIG. 12 is a sectional view of an optical system in Example 12 of the image display apparatus according to the present invention.

In this example, as shown in the sectional view of FIG. 12, the horizontal field angle is 20°, while the vertical field angle is 15°, and the pupil diameter is 4 millimeters. The first surface 11 performs a negative refracting action. The second surface 12, the third surface 13, the fourth surface 14 and the fifth surface 15 perform positive, negative, positive and negative reflecting actions, respectively. The sixth surface 16 performs a positive refracting action. A single surface serves as all the first surface 11, the third surface 13 and the fifth surface 15. A single surface serves as both the fourth surface 14 and the sixth surface 16. The first surface 11 is a spherical surface. The second surface 12 is an anamorphic surface. The fourth surface 14 is an aspherical surface.

In this example, the decentration angle of the second surface 12 is increased to a certain extent, and regions required for the second reflection (at the third surface 13) and the third reflection (at the fourth surface 14) are arranged to perform total reflection, thereby preventing loss of light.

Constituent parameters of the above-described Examples 1 to 12 are as follows:

| Surface No. | Radius of curvature | Surface separation | Refractive index (Eccentricity) | Abbe's No. (Inclination angle) |
|---|---|---|---|---|
| Example 1 | | | | |
| 1 | ∞ (pupil) | 40.000000 | | |
| 2 | 1764.02220 | | 1.5163 | 64.15 |

-continued

| Surface No. | | Radius of curvature | Surface separation | | Refractive index (Eccentricity) | | Abbe's No. (Inclination angle) |
|---|---|---|---|---|---|---|---|
| | | | | Y | 20.000 | θ | −26.00° |
| 3 | $R_y$ | −96.08374 | | | 1.5163 | | 64.15 |
| | $R_x$ | −94.31236 | | Y | 20.000 | θ | 33.00° |
| | $K_y$ | 0.630787 | | Z | 35.500 | | |
| | $K_x$ | −0.460369 | | | | | |
| | AR | $0.599983 \times 10^{-8}$ | | | | | |
| | BR | $0.573962 \times 10^{-13}$ | | | | | |
| | AP | $0.519983 \times 10^{1}$ | | | | | |
| | BP | $-0.943735 \times 10^{1}$ | | | | | |
| 4 | $R_y$ | −45.43665 | | | 1.5163 | | 64.15 |
| | $R_x$ | −52.13341 | | Y | −10.000 | θ | 20.00° |
| | | | | Z | 25.000 | | |
| 5 | $R_y$ | −96.08374 | | | 1.5163 | | 64.15 |
| | $R_x$ | −94.31236 | | Y | 20.000 | θ | 33.00° |
| | $K_y$ | 0.630787 | | Z | 35.500 | | |
| | $K_x$ | −0.460369 | | | | | |
| | AR | $0.599983 \times 10^{-8}$ | | | | | |
| | BR | $0.573962 \times 10^{-13}$ | | | | | |
| | AP | $0.519983 \times 10^{1}$ | | | | | |
| | BP | $-0.943735 \times 10^{1}$ | | | | | |
| 6 | | −29.40670 | | Y | −33.767 | θ | 60.00° |
| | | | | Z | 23.019 | | |
| 7 | | (display device) | | Y | −46.380 | θ | 29.23° |
| | | | | Z | 26.771 | | |
| Example 2 | | | | | | | |
| 1 | | ∞ (pupil) | 40.000000 | | | | |
| 2 | | −320.54986 | | | 1.5163 | | 64.15 |
| | | | | Y | 20.000 | θ | −25.00° |
| 3 | $R_y$ | −456.05828 | | | 1.5163 | | 64.15 |
| | $R_x$ | −136.36546 | | Y | 30.000 | θ | 30.00° |
| | $K_y$ | 32.173173 | | Z | 27.000 | | |
| | $K_x$ | −1.134013 | | | | | |
| | AR | $-0.487820 \times 10^{-7}$ | | | | | |
| | BR | $0.135721 \times 10^{-10}$ | | | | | |
| | AP | $0.198155 \times 10^{1}$ | | | | | |
| | BP | 0.717523 | | | | | |
| 4 | | ∞ | | | 1.5163 | | 64.15 |
| | | | | Y | −10.000 | θ | 18.00° |
| | | | | Z | 27.000 | | |
| 5 | $R_y$ | −456.05824 | | | 1.5163 | | 64.15 |
| | $R_x$ | −136.36546 | | Y | 30.000 | θ | 30.00° |
| | $K_y$ | 32.173173 | | Z | 27.000 | | |
| | $K_x$ | −1.134013 | | | | | |
| | AR | $-0.487820 \times 10^{-7}$ | | | | | |
| | BR | $0.135721 \times 10^{-10}$ | | | | | |
| | AP | $0.198155 \times 10^{1}$ | | | | | |
| | BP | 0.717523 | | | | | |
| 6 | | 303.68850 | | Y | −11.00 | θ | 50.00° |
| | | | | Z | 5.000 | | |
| 7 | | (display device) | | Y | −46.738 | θ | 26.69° |
| | | | | Z | 32.363 | | |
| Example 3 | | | | | | | |
| 1 | | ∞ (pupil) | 40.000000 | | | | |
| 2 | | −314.26572 | | | 1.5163 | | 64.15 |
| | | | | Y | 20.000 | θ | −25.00° |
| 3 | $R_y$ | −593.06768 | | | 1.5163 | | 64.15 |
| | $R_x$ | −156.92867 | | Y | 30.000 | θ | 30.00° |
| | $K_y$ | 41.746771 | | Z | 27.000 | | |
| | $K_x$ | −0.191341 | | | | | |
| | AR | $-0.273707 \times 10^{-7}$ | | | | | |
| | BR | $0.885636 \times 10^{-11}$ | | | | | |
| | AP | $0.215678 \times 10^{1}$ | | | | | |
| | BP | 0.545500 | | | | | |
| 4 | | 1082.84617 | | | 1.5163 | | 64.15 |
| | | | | Y | −10.000 | θ | 18.00° |
| | | | | Z | 27.000 | | |
| 5 | $R_y$ | −593.06768 | | | 1.5163 | | 64.15 |
| | $R_x$ | −156.92867 | | Y | 30.000 | θ | 30.00° |
| | $K_y$ | 41.746771 | | Z | 27.000 | | |
| | $K_x$ | −0.191341 | | | | | |
| | AR | $-0.273707 \times 10^{-7}$ | | | | | |
| | BR | $0.885636 \times 10^{-11}$ | | | | | |
| | AP | $0.215678 \times 10^{1}$ | | | | | |
| | BP | 0.545500 | | | | | |

-continued

| Surface No. | | Radius of curvature | Surface separation | Refractive index (Eccentricity) | | | Abbe's No. (Inclination angle) | |
|---|---|---|---|---|---|---|---|---|
| 6 | | 251.15440 | | Y | −16.000 | θ | | 50.00° |
|   | | | | Z | 5.000 | | | |
| 7 | | (display device) | | Y | −55.469 | θ | | 33.60° |
|   | | | | Z | 36.251 | | | |

Example 4

| 1 | | ∞ (pupil) | 40.000000 | | | | | |
|---|---|---|---|---|---|---|---|---|
| 2 | | 57.18530 | | | 1.5163 | | | 64.15 |
|   | | | | Y | 12.000 | θ | | −43.00° |
| 3 | $R_y$ | 868.45380 | | | 1.5163 | | | 64.15 |
|   | $R_x$ | ∞ | | Y | −10.000 | θ | | 28.00° |
|   | $K_y$ | 0.000000 | | Z | 50.000 | | | |
|   | $K_x$ | 0.000000 | | | | | | |
|   | AR | $0.124685 \times 10^{-5}$ | | | | | | |
|   | BR | $-0.652413 \times 10^{-9}$ | | | | | | |
|   | AP | −0.165730 | | | | | | |
|   | BP | −0.365555 | | | | | | |
| 4 | | 147.37540 | | | 1.5163 | | | 64.15 |
|   | | | | Y | −15.000 | θ | | 23.00° |
|   | | | | Z | 30.000 | | | |
| 5 | $R_y$ | 868.45380 | | | 1.5163 | | | 64.15 |
|   | $R_x$ | ∞ | | Y | −10.000 | θ | | 28.00° |
|   | $K_y$ | 0.000000 | | Z | 50.000 | | | |
|   | $K_x$ | 0.000000 | | | | | | |
|   | AR | $0.124685 \times 10^{-5}$ | | | | | | |
|   | BR | $-0.652413 \times 10^{-9}$ | | | | | | |
|   | AP | −0.165730 | | | | | | |
|   | BP | −0.365555 | | | | | | |
| 6 | | −79.53881 | | Y | −51.862 | θ | | 63.19° |
|   | | | | Z | 93.453 | | | |
| 7 | | (display device) | | Y | −54.387 | θ | | 52.33° |
|   | | | | Z | 51.508 | | | |

Example 5

| 1 | | ∞ (pupil) | 43.198270 | | | | | |
|---|---|---|---|---|---|---|---|---|
| 2 | | −154.11722 | | | 1.5163 | | | 64.15 |
|   | | | | Y | 11.843 | θ | | −3.56° |
| 3 | | −98.60496 | | | 1.5163 | | | 64.15 |
|   | | | | Y | −8.262 | θ | | 21.60° |
|   | | | | Z | 60.507 | | | |
| 4 | | −59.99319 | | | 1.5163 | | | 64.15 |
|   | | | | Y | −17.051 | θ | | 14.12° |
|   | | | | Z | 39.865 | | | |
| 5 | | −65.24193 | | | 1.5163 | | | 64.15 |
|   | | | | Y | 6.268 | θ | | 8.14° |
|   | | | | Z | 61.267 | | | |
| 6 | | −59.99319 | | Y | −17.051 | θ | | 14.12° |
|   | | | | Z | 39.865 | | | |
| 7 | | (display device) | | Y | −25.346 | θ | | −10.15° |
|   | | | | Z | 30.966 | | | |

Example 6

| 1 | | ∞ (pupil) | 42.121188 | | | | | |
|---|---|---|---|---|---|---|---|---|
| 2 | | −99.01221 | | | 1.5163 | | | 64.15 |
|   | | | | Y | 5.523 | θ | | 0.34° |
| 3 | $R_y$ | −88.43182 | | | 1.5163 | | | 64.15 |
|   | $R_x$ | −80.99168 | | Y | −4.695 | θ | | 27.73° |
|   | $K_y$ | 2.538049 | | Z | 59.773 | | | |
|   | $K_x$ | 2.386173 | | | | | | |
|   | AR | $0.429783 \times 10^{-6}$ | | | | | | |
|   | BR | $0.213199 \times 10^{-9}$ | | | | | | |
|   | AP | $-0.193163 \times 10^{-1}$ | | | | | | |
|   | BP | $-0.399975 \times 10^{-1}$ | | | | | | |
| 4 | | −51.86844 | | | 1.5163 | | | 64.15 |
|   | | | | Y | −17.331 | θ | | 23.29° |
|   | | | | Z | 42.790 | | | |
| 5 | | −65.95889 | | | 1.5163 | | | 64.15 |
|   | | | | Y | −13.843 | θ | | −0.82° |
|   | | | | Z | 62.191 | | | |
| 6 | | −51.86844 | | Y | −17.331 | θ | | 23.29° |
|   | | | | Z | 42.790 | | | |
| 7 | | (display device) | | Y | −30.783 | θ | | −5.46° |
|   | | | | Z | 36.202 | | | |

Example 7

| 1 | | ∞ (pupil) | 26.241096 | | | | | |

-continued

| Surface No. | | Radius of curvature | Surface separation | Refractive index (Eccentricity) | | Abbe's No. (Inclination angle) | |
|---|---|---|---|---|---|---|---|
| 2 | | 167.29667 | | | 1.5163 | | 64.15 |
| | | | | Y | 25.000 | θ | −18.00° |
| 3 | $R_y$ | 400.00000 | | | 1.5163 | | 64.15 |
| | $R_x$ | 177.85569 | | Y | −5.772 | θ | 38.27° |
| | $K_y$ | −73.497842 | | Z | 41.698 | | |
| | $K_x$ | 92.518261 | | | | | |
| | AR | $0.177242 \times 10^{-6}$ | | | | | |
| | BR | $-0.568486 \times 10^{-10}$ | | | | | |
| | AP | $0.237897 \times 10^{1}$ | | | | | |
| | BP | $0.110409 \times 10^{1}$ | | | | | |
| 4 | $R_y$ | 200.00000 | | | 1.5163 | | 64.15 |
| | $R_x$ | 135.53337 | | Y | 6.724 | θ | 31.39° |
| | $K_y$ | −1.971137 | | Z | −5.146 | | |
| | $K_x$ | 14.684583 | | | | | |
| | AR | $0.150600 \times 10^{-7}$ | | | | | |
| | BR | $-0.163595 \times 10^{-10}$ | | | | | |
| | AP | $0.272666 \times 10^{1}$ | | | | | |
| | BP | −0.309412 | | | | | |
| 5 | $R_y$ | 400.00000 | | | 1.5163 | | 64.15 |
| | $R_x$ | 177.85569 | | Y | −5.772 | θ | 38.27° |
| | $K_y$ | −73.497842 | | Z | 41.698 | | |
| | $K_x$ | 92.518261 | | | | | |
| | AR | $0.177242 \times 10^{6}$ | | | | | |
| | BR | $-0.568486 \times 10^{-10}$ | | | | | |
| | AP | $0.237897 \times 10^{1}$ | | | | | |
| | BP | $0.110409 \times 10^{1}$ | | | | | |
| 6 | $R_y$ | 200.00000 | | | 1.5163 | | 64.15 |
| | $R_x$ | 135.53337 | | Y | 6.724 | θ | 31.39° |
| | $K_y$ | −1.971137 | | Z | −5.146 | | |
| | $K_x$ | 14.684583 | | | | | |
| | AR | $0.150600 \times 10^{-7}$ | | | | | |
| | BR | $-0.163595 \times 10^{-10}$ | | | | | |
| | AP | $0.272666 \times 10^{1}$ | | | | | |
| | BP | −0.309412 | | | | | |
| 7 | $R_y$ | 400.00000 | | Y | −5.772 | θ | 38.27° |
| | $R_x$ | 177.85569 | | Z | 41.698 | | |
| | $K_y$ | −73.497842 | | | | | |
| | $K_x$ | 92.518261 | | | | | |
| | AR | $0.177242 \times 10^{-6}$ | | | | | |
| | BR | $-0.568486 \times 10^{-10}$ | | | | | |
| | AP | $0.237897 \times 10^{1}$ | | | | | |
| | BP | $0.110409 \times 10^{1}$ | | | | | |
| 8 | | (display device) | | Y | −6.101 | θ | 49.39° |
| | | | | Z | 66.376 | | |

Example 8

| 1 | | ∞ (pupil) | 34.613115 | | | | |
|---|---|---|---|---|---|---|---|
| 2 | | −136.74672 | | | 1.5163 | | 64.15 |
| | | | | Y | 25.000 | θ | −19.00° |
| 3 | $R_y$ | 7726.59068 | | | 1.5163 | | 64.15 |
| | $R_x$ | 3533.09634 | | Y | 15.000 | θ | 23.00° |
| | $K_y$ | 5363.757036 | | Z | 28.613 | | |
| | $K_x$ | −400868 | | | | | |
| | AR | $-0.905748 \times 10^{-9}$ | | | | | |
| | BR | $-0.571148 \times 10^{-9}$ | | | | | |
| | AP | $-0.205527 \times 10^{2}$ | | | | | |
| | BP | −0.986043 | | | | | |
| 4 | $R_y$ | 161.32734 | | | 1.5163 | | 64.15 |
| | $R_x$ | 166.28066 | | Y | 8.000 | θ | 15.00° |
| | $K_y$ | −1.069282 | | Z | 9.613 | | |
| | $K_x$ | 17.315883 | | | | | |
| | AR | $-0.186014 \times 10^{-6}$ | | | | | |
| | BR | $-0.686556 \times 10^{-9}$ | | | | | |
| | AP | 0.462801 | | | | | |
| | BP | $-0.106780 \times 10^{1}$ | | | | | |
| 5 | $R_y$ | 7726.59068 | | | 1.5163 | | 64.15 |
| | $R_x$ | 3533.09634 | | Y | 15.000 | θ | 23.00° |
| | $K_y$ | 5363.757036 | | Z | 28.613 | | |
| | $K_x$ | −400868 | | | | | |
| | AR | $-0.905748 \times 10^{-9}$ | | | | | |
| | BR | $-0.571148 \times 10^{-9}$ | | | | | |
| | AP | $-0.205527 \times 10^{2}$ | | | | | |
| | BP | −0.986043 | | | | | |
| 6 | $R_y$ | 161.32734 | | | 1.5163 | | 64.15 |
| | $R_x$ | 166.28066 | | Y | 8.000 | θ | 15.00° |
| | $K_y$ | −1.069282 | | Z | 9.613 | | |

-continued

| Surface No. | | Radius of curvature | Surface separation | Refractive index (Eccentricity) | | Abbe's No. (Inclination angle) | |
|---|---|---|---|---|---|---|---|
| | $K_x$ | 17.315883 | | | | | |
| | AR | $-0.186014 \times 10^{-6}$ | | | | | |
| | BR | $-0.686556 \times 10^{-9}$ | | | | | |
| | AP | 0.462801 | | | | | |
| | BP | $-0.106780 \times 10^{1}$ | | | | | |
| 7 | $R_y$ | 7726.59068 | | Y | 15.000 | θ | 23.00° |
| | $R_x$ | 3533.09634 | | Z | 28.613 | | |
| | $K_y$ | 5363.757036 | | | | | |
| | $K_x$ | $-400868$ | | | | | |
| | AR | $-0.905748 \times 10^{-9}$ | | | | | |
| | BR | $-0.571148 \times 10^{-9}$ | | | | | |
| | AP | $-0.205527 \times 10^{2}$ | | | | | |
| | BP | $-0.986043$ | | | | | |
| 8 | | (display device) | | Y | $-43.539$ | θ | 13.38° |
| | | | | Z | 64.310 | | |
| Example 9 | | | | | | | |
| 1 | | ∞ (pupil) | 26.631856 | | | | |
| 2 | | $-297.47001$ | | | 1.5163 | | 64.15 |
| | | | | Y | 29.410 | θ | $-0.23°$ |
| 3 | $R_y$ | $-184.73185$ | | | 1.5163 | | 64.15 |
| | $R_x$ | $-95.63311$ | | Y | 16.029 | θ | 33.92° |
| | $K_y$ | $-3.197796$ | | Z | 31.944 | | |
| | $K_x$ | $-4.108356$ | | | | | |
| | AR | $-0.137210 \times 10^{-6}$ | | | | | |
| | BR | $-0.487014 \times 10^{-13}$ | | | | | |
| | AP | $-0.829115$ | | | | | |
| | BP | $-0.707304 \times 10^{-2}$ | | | | | |
| 4 | $R_y$ | $-391.71678$ | | | 1.5163 | | 64.15 |
| | $R_x$ | $-70.59919$ | | Y | $-18.905$ | θ | 16.13° |
| | | | | Z | 28.517 | | |
| 5 | $R_y$ | $-184.73185$ | | | 1.5163 | | 64.15 |
| | $R_x$ | $-95.63311$ | | Y | 16.029 | θ | 33.92° |
| | $K_y$ | $-3.197796$ | | Z | 31.944 | | |
| | $K_x$ | $-4.108356$ | | | | | |
| | AR | $-0.137210 \times 10^{-6}$ | | | | | |
| | BR | $-0.487041 \times 10^{-13}$ | | | | | |
| | AP | $-0.829115$ | | | | | |
| | BP | $-0.707304 \times 10^{-2}$ | | | | | |
| 6 | | 1829.41197 | | | 1.5163 | | 64.15 |
| | | | | Y | $-58.589$ | θ | 46.87° |
| | | | | Z | 57.831 | | |
| 7 | $R_y$ | $-184.73185$ | | Y | 16.029 | θ | 33.92° |
| | $R_x$ | $-95.63311$ | | Z | 31.944 | | |
| | $K_y$ | $-3.197796$ | | | | | |
| | $K_x$ | $-4.108356$ | | | | | |
| | AR | $-0.137210 \times 10^{-6}$ | | | | | |
| | BR | $-0.487041 \times 10^{-13}$ | | | | | |
| | AP | $-0.829115$ | | | | | |
| | BP | $-0.707304 \times 10^{-2}$ | | | | | |
| 8 | | (display device) | | Y | $-37.269$ | θ | 54.31° |
| | | | | Z | 67.891 | | |
| Example 10 | | | | | | | |
| 1 | | ∞ (pupil) | 25.000000 | | | | |
| 2 | | $-73.69439$ | 11.000000 | | 1.5254 | | 56.25 |
| 3 | $R_y$ | $-78.61295$ | $-11.000000$ | | 1.5254 | | 56.25 |
| | $R_x$ | $-85.97323$ | | | | θ | $-20.00°$ |
| | $K_y$ | 0.000000 | | | | | |
| | $K_x$ | 0.000000 | | | | | |
| | AR | $0.415207 \times 10^{-7}$ | | | | | |
| | BR | $-0.832689 \times 10^{-20}$ | | | | | |
| | AP | $-0.609314$ | | | | | |
| | BP | $-0.171838 \times 10^{4}$ | | | | | |
| 4 | | $-73.69440$ | 15.000000 | | 1.5254 | | 56.25 |
| 5 | | $-64.46863$ | $-15.000000$ | | 1.5254 | | 56.25 |
| | A | $-0.168798 \times 10^{-6}$ | | | | θ | $-0.86°$ |
| | B | $-0.594747 \times 10^{-10}$ | | | | | |
| 6 | | $-73.69440$ | 15.000000 | | 1.5254 | | 56.25 |
| 7 | | $-64.46863$ | | | | θ | $-0.86°$ |
| | A | $-0.168798 \times 10^{-6}$ | | | | | |
| | B | $-0.594747 \times 10^{-10}$ | | | | | |
| 8 | | (display device) | | Y | 41.890 | θ | 47.28° |
| | | | | Z | 28.969 | | |

-continued

| Surface No. | | Radius of curvature | Surface separation | Refractive index (Eccentricity) | | Abbe's No. (Inclination angle) |
|---|---|---|---|---|---|---|
| Example 11 | | | | | | |
| 1 | | ∞ (pupil) | 25.000000 | | | |
| 2 | | −67.46452 | 11.000000 | 1.5254 | | 56.25 |
| 3 | $R_y$ | −69.61671 | −11.000000 | 1.5254 | | 56.25 |
|   | $R_x$ | −75.18047 | | | θ | −20.00° |
|   | $K_y$ | 0.000000 | | | | |
|   | $K_x$ | 0.000000 | | | | |
|   | AR | $0.987914 \times 10^{-7}$ | | | | |
|   | BR | $-0.192617 \times 10^{-19}$ | | | | |
|   | AP | 0.422774 | | | | |
|   | BP | $-0.171838 \times 10^{4}$ | | | | |
| 4 | | −67.46453 | 15.000000 | 1.5254 | | 56.25 |
| 5 | $R_y$ | −58.19055 | −15.000000 | 1.5254 | | 56.25 |
|   | $R_x$ | −65.16835 | | | θ | 1.83° |
|   | $K_y$ | 0.000000 | | | | |
|   | $K_x$ | 0.000000 | | | | |
|   | AR | $-0.108168 \times 10^{-6}$ | | | | |
|   | BR | $0.271296 \times 10^{-20}$ | | | | |
|   | AP | 0.425652 | | | | |
|   | BP | $0.161507 \times 10^{4}$ | | | | |
| 6 | | −67.46453 | 15.000000 | 1.5254 | | 56.25 |
| 7 | $R_y$ | −58.19055 | | | θ | 1.83° |
|   | $R_x$ | −65.16835 | | | | |
|   | $K_y$ | 0.000000 | | | | |
|   | $K_x$ | 0.000000 | | | | |
|   | AR | $-0.108168 \times 10^{-6}$ | | | | |
|   | BR | $0.271296 \times 10^{-20}$ | | | | |
|   | AP | 0.425652 | | | | |
|   | BP | $0.161507 \times 10^{4}$ | | | | |
| 8 | | (display device) | | Y 35.537 | θ | 45.74° |
|   | | | | Z 30.528 | | |
| Example 12 | | | | | | |
| 1 | | ∞ (pupil) | 25.000000 | | | |
| 2 | | −105.56915 | 9.000000 | 1.5254 | | 56.25 |
| 3 | $R_y$ | −104.07077 | −9.000000 | 1.5254 | | 56.25 |
|   | $R_x$ | −125.75475 | | | θ | −30.00° |
|   | $K_y$ | 0.000000 | | | | |
|   | $K_x$ | 0.000000 | | | | |
|   | AR | $0.450724 \times 10^{-6}$ | | | | |
|   | BR | $-0.172957 \times 10^{-18}$ | | | | |
|   | AP | $0.682240 \times 10^{-1}$ | | | | |
|   | BP | $-0277731 \times 10^{4}$ | | | | |
| 4 | | −105.56917 | 13.000000 | 1.5254 | | 56.25 |
| 5 | | −69.93281 | −13.000000 | 1.5254 | | 56.25 |
|   | A | $-0.135328 \times 10^{-5}$ | | | θ | 5.12° |
|   | B | $0.831326 \times 10^{-9}$ | | | | |
|   | C | $-0.316960 \times 10^{-12}$ | | | | |
| 6 | | −105.56917 | 13.000000 | 1.5254 | | 56.25 |
| 7 | | −69.93281 | | | θ | 5.12° |
|   | A | $-0.135328 \times 10^{-5}$ | | | | |
|   | B | $0.831326 \times 10^{-9}$ | | | | |
|   | C | $-0.316960 \times 10^{-12}$ | | | | |
| 8 | | (display device) | | Y 47.595 | θ | 26.02° |
|   | | | | Z 38.465 | | |

The following are the values of parameters in the above-described Examples 1 to 12 corresponding to the conditions (1) to (5):

| Example | Surface No. | θ | $R_x/R_y$ |
|---|---|---|---|
| 1 | 3 | 54.62 | 0.982 |
|   | 4 | | 1.147 |
| 2 | 3 | 64.08 | 0.299 |
| 3 | 3 | 68.38 | 0.265 |
| 4 | 3 | 74.74 | ∞ |
| 5 | | 58.24 | |
| 6 | 3 | 64 | 0.916 |
| 7 | 3 | 80.9 | 0.445 |
|   | 4 | | 0.678 |
| 8 | 3 | 67.14 | 0.457 |
|   | 4 | | 1.031 |
| 9 | 3 | 60.04 | 0.518 |
|   | 4 | | 0.180 |
| 10 | 2 | 40 | 1.094 |
| 11 | 2 | 40 | 1.080 |
|   | 4 | | 1.120 |
| 12 | 2 | 60 | 1.208 |

As has been described above, it is possible according to the present invention to provide an ocular optical system for a head- or face-mounted image display apparatus which is compact, lightweight and favorably corrected for aberrations.

What we claim is:

1. An image display apparatus comprising:

an image display unit for displaying an image, and an optical system for projecting said image into an observer's eyeball, said optical system including a prism member, said prism member having, from a side thereof closer to said observer's eyeball toward said image display unit, at least an exit surface having an action through which a bundle of light rays exits from said prism member; a first reflecting surface, a second reflecting surface and a third reflecting surface each having an action by which the light rays are reflected in said prism member; and an entrance surface having an action through which the light rays enter said prism member, said prism member being formed from at least three surfaces and a medium lying between said three surfaces, said three surfaces being arranged to attain the actions of said exit surface, said first to third reflecting surfaces and said entrance surface, wherein at least two of said three surfaces each have a reflecting action by which the light rays are reflected at least once or more, and said at least two of said three surfaces are disposed at respective positions facing opposite to each other across the medium, and wherein each of said two surfaces facing opposite to each other is a non-rotationally symmetric aspherical surface that gives a power to the light rays and corrects aberrations due to decentration.

2. An image display apparatus comprising:

an image display unit for displaying an image, and an optical system for projecting said image into an observer's eyeball, said optical system including a prism member, said prism member having, from a side thereof closer to said observer's eyeball toward said image display unit, at least an exit surface having an action through which a bundle of light rays exits from said prism member; a first reflecting surface, a second reflecting surface and a third reflecting surface each having an action by which the light rays are reflected in said prism member; and an entrance surface having an action through which the light rays enter said prism member, said prism member being formed from at least three surfaces and a medium lying between said three surfaces, said three surfaces being arranged to attain the action of said exit surface, said first to third reflecting surfaces and said entrance surface, wherein at least one of said three surfaces is a dual-purpose optical surface that performs at least one of, a transmission and a reflection, and two or more reflections, and wherein said dual-purpose optical surface has a non-rotationally symmetric aspherical configuration, whereby an action by which a power is given to the light rays and aberrations due to decentration are corrected a plurality of times by a single surface.

3. An image display apparatus according to claim 1 or 2, wherein said first reflecting surface and third reflecting surface of said prism member are formed from a single reflecting surface serving as the first and third reflecting surfaces, so that said prism member comprises four surfaces, said four surfaces being said exit surface, said entrance surface, said second reflecting surface, and said reflecting surface serving as the first and third reflecting surfaces, and said four surfaces face each other across said medium.

4. An image display apparatus according to claim 3, wherein an angle θ between an incident angle and a reflection angle with respect to a first reflecting surface satisfies the following condition:

$$30°<\theta<90° \quad (1).$$

5. An image display apparatus according to claim 3, wherein said non-rotationally symmetric a spherical surface is an anamorphic surface.

6. An image display apparatus according to claim 3, wherein said entrance surface has a configuration that gives a negative power to the light rays.

7. An image display apparatus according to claim 1 or 2, wherein said prism member has a fourth reflecting surface in an optical path between said third reflecting surface and said entrance surface.

8. An image display apparatus according to claim 7, wherein said entrance surface, first reflecting surface and third reflecting surface of said prism member are formed from a single reflecting surface serving as the entrance and reflecting surface, and said second reflecting surface and fourth reflecting surface of said prism member are formed from a single reflecting surface serving as the second and fourth reflecting surfaces, so that said prism member comprises three surfaces, said three surfaces being said exit surface, said reflecting surface serving as the second and fourth reflecting surfaces, and said reflecting surfaces serving as the entrance and reflecting surfaces, said three surfaces facing each other across said medium.

9. An image display apparatus according to claim 7, wherein said entrance surface, first reflecting surface and third reflecting surface of said prism member are formed from a single reflecting surface serving as the entrance and reflecting surfaces, so that said prism member comprises four surfaces, said four surfaces being said exit surface, said second reflecting surface, said fourth reflecting surface, and said reflecting surface serving as the entrance and reflecting surfaces, said four surfaces facing each other across said medium.

10. An image display apparatus according to claim 8 or 9, wherein said third reflecting surface reflects the light rays by total reflection, and at least a region of said third reflecting surface overlaps a region of said entrance surface.

11. An image display apparatus according to claim 10, wherein an angle θ between an incident angle and a reflection angle with respect to a first reflecting surface satisfies the following condition:

$$30°<\theta<90° \quad (1).$$

12. An image display apparatus according to claim 10, wherein said non-rotationally symmetric a spherical surface is an anamorphic surface.

13. An image display apparatus according to claim 1 or 2, wherein said optical system consists of said prism member.

14. A head-mounted image display apparatus according to claim 1 or 2, wherein said image display apparatus has a support member that supports said image display apparatus on an observer's head such that said image display apparatus is held in front of an observer's face.

* * * * *